United States Patent [19]
Brock

[11] 3,798,727
[45] Mar. 26, 1974

[54] METHOD OF MAKING A FLUIDIC DEVICE
[75] Inventor: Bruce A. Brock, Minneapolis, Minn.
[73] Assignee: Honeywell Inc., Minneapolis, Minn.
[22] Filed: May 18, 1973
[21] Appl. No.: 361,704

Related U.S. Application Data
[63] Continuation-in-part of Ser. No. 158,029, June 29, 1971, abandoned.

[52] U.S. Cl. ............... 29/157 R, 76/107 R, 137/833
[51] Int. Cl. ................... B21d 53/00, B23p 15/00
[58] Field of Search ................. 29/157 R; 76/107 R; 137/833

[56] References Cited
UNITED STATES PATENTS

| | | | |
|---|---|---|---|
| 3,191,612 | 6/1965 | Phillips | 137/823 |
| 3,334,401 | 8/1967 | Hopkinson | 29/157 R |
| 3,441,996 | 5/1969 | Boothe | 29/157 R |
| 3,453,859 | 7/1969 | Gillet | 29/157 R X |
| 3,495,604 | 2/1970 | Trask | 137/833 X |
| 3,668,756 | 6/1972 | Wieme | 29/157 R |
| 3,727,489 | 4/1973 | Inoue | 76/107 R |

Primary Examiner—Charles W. Lanham
Assistant Examiner—D. C. Reiley, III
Attorney, Agent, or Firm—Lamont B. Koontz; Trevor B. Joike

[57] ABSTRACT

A precision impression forming method of making a fluidic device, comprising: forming a blank of a relatively soft metal; placing the blank and a form punch in a die-set, the form punch having a raised pattern of the desired configuration of the fluidic device on its face; placing the die-set in a press capable of exerting a high force; pressing the form into the blank to a predetermined depth; finishing the face of the blank to a predetermined surface finish; fabricating a coverplate for the fluidic device; forming the necessary ports for the fluidic device in the blank or coverplate or both; and, assembling the blank and coverplate in a fluid-tight relation.

10 Claims, 7 Drawing Figures

PATENTED MAR 26 1974          3,798,727

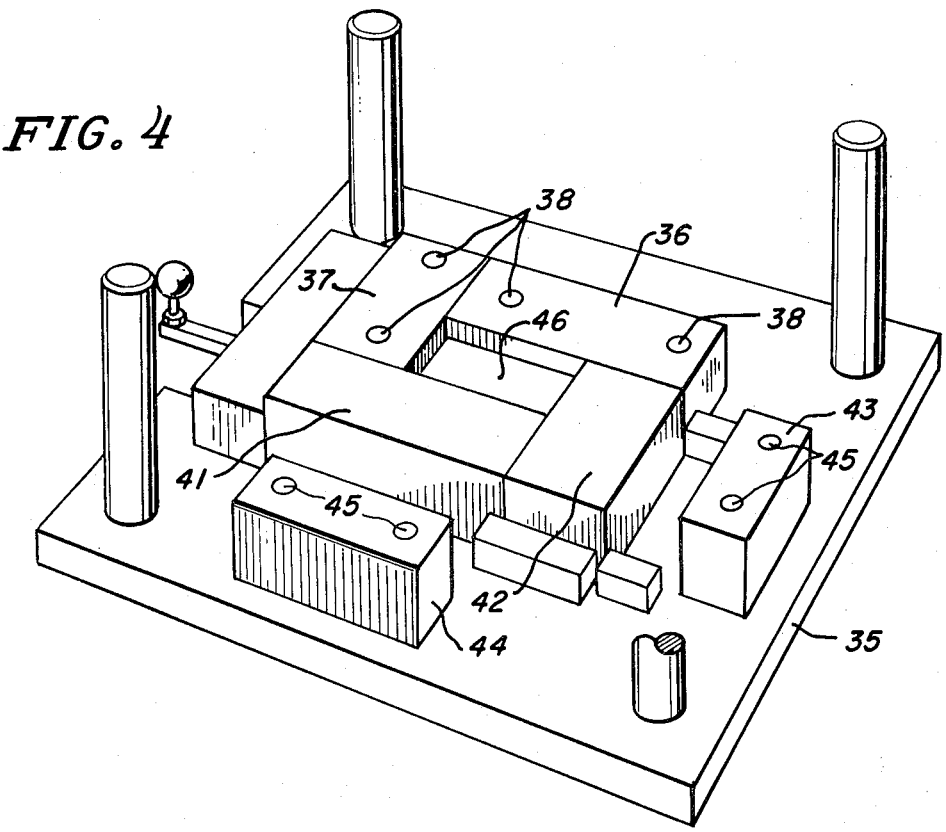
FIG. 4
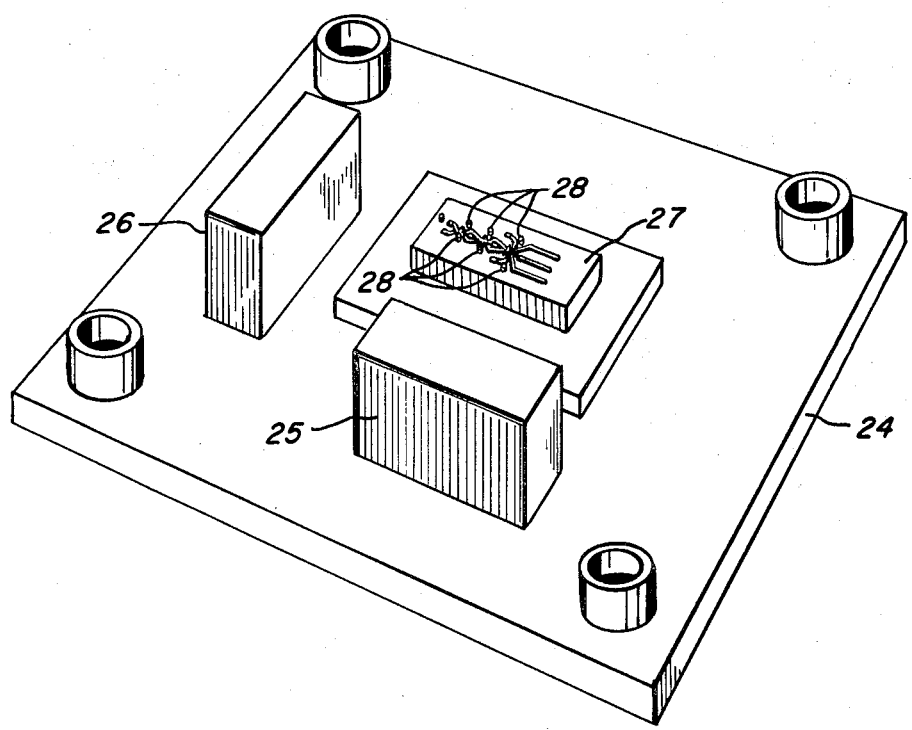

METHOD OF MAKING A FLUIDIC DEVICE

BACKGROUND AND SUMMARY OF THE INVENTION

This is a continuation in part of application Ser. No. 158,029 filed June 29, 1971, now abandoned.

This invention relates to a method of forming a fluidic device and more particularly to a precision impression forming method of making highly detailed and precise patterns of fluidic devices in blanks at a relatively low cost.

Prior art methods of making fluidic devices include etching, casting, molding, or milling the desired configuration into a plate, stacking together a plurality of plates each having a predetermined cutaway portion which, when the plates are stacked together, register to form the desired fluid passageways, and so forth. Some of these diverse methods have inherent problems of accuracy which is a stringent requirement for making operable fluidic devices. Most of these methods of making fluidic devices are plagued by high costs. On the other hand the subject inventive method of making fluidic devices comprises a simple method of making a very precise configuration of a fluidic device at a suprisingly low cost. In addition the method lends itself to mass production since the pattern of any given fluidic device may be precisely duplicated time after time.

These and other advantages of the inventive method of making fluidic devices will be better appreciated upon reviewing the drawing and reading the detailed description of the invention.

DESCRIPTION OF THE DRAWING

FIG. 4 is a perspective view of the die-set suitable for forming the press impression of the fluidic device.

DETAILED DESCRIPTION OF THE INVENTION

Figure 1:
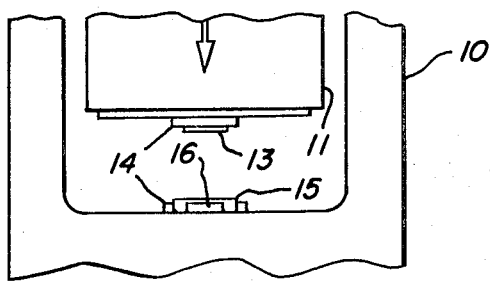
FIG. 1 is a simplified schematic illustration of a press suitable for forming the precision impression of the fluidic device in a blank.

FIG. 1 shows a press 10 and a ram 11 associated therewith. Affixed to the ram is a form punch 13 held to the ram by suitable means including one-half of a die-set 14. Held firmly in place on the bed of the press 10 is the other half of the die-set 14 which includes a nest 15 wherein the blank 16 is located. While FIG. 1 shows a greatly simplified press, it will be appreciated that it is critical for the form punch 13 and the blank 16 to meet in a precisely predetermined fashion. For this reason, and because the force which is exerted in pressing the form punch into the blank is in excess of 100–200 tons, a rigid and durable die-set is required for securing the blank and the form punch.

Figure 2:
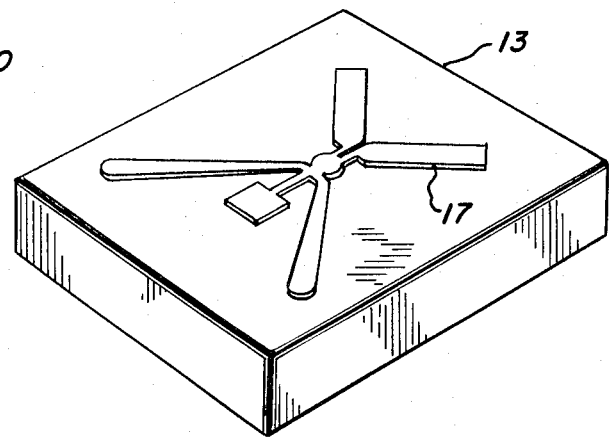
FIG. 2 is a perspective view of a form punch suitable for forming the precision impression of the fluidic device in the blank.

FIG. 2 shows the form punch 13 having on the face thereof a raised pattern 17 of a fluidic device. The term "fluidic device" is intended to include no-moving-parts fluid devices such as single and multiple stage fluidic amlifiers, oscillators, wall-attachment devices, and so forth. Because of the high forces involved in forming the pattern of the fluidic device in the blank, the need for precision in the configuration of the fluidic device, and the desirability of having a form punch with a relatively long life, the material used and the method of making the form punch is quite important. Very hard material such as solid carbide of a medium density and high impact strength has been found most suitable for the form punch because it can resist the high unit pressures without deformation. Because such material is extremely difficult to machine, the most desirable method of making the raised pattern of the fluidic device on the face of the form punch is believed to be electrical discharge machining.

To make the form punch by electrical discharge machining (EDM), the desired fluidic device configuration is accurately etched onto a suitable medium such as a sheet of Mylar plastic at a scale of, for example, 20 to 1. This pattern on the Mylar plastic is then transferred to a plastic plate by means of a photoelectric eye linked to a milling machine. The 20 to 1 scale is reduced, for example, to a 4 to 1 scale on the plastic plate, which is then used as a template. The template is put on a precision tracing machine and the pattern is reproduced down to a 1 to 1 scale on a plurality of graphite electrodes. Certain dimensional changes are incorporated into the electrode to compensate for overburn, as well known in the art. The plurality of electrodes are then used to burn into the form punches on an electrical discharge machine the fluidic device configuration. As a high degree of precision is desirable, multiple burns at low amperage are performed in order that electrode erosion be minimized. After the pattern of the fluidic device is formed on the form punch as shown in FIG. 2, the punch surface is ground and polished to the desirable surface finish as may be required.

The dimensions, except for the height, of the raised pattern on the form punch should correspond as nearly as possible to the desired dimensions of the fluidic device itself. The height of the pattern should exceed the desired depth of the fluidic device pattern for two reasons; first, because of die breakage, that is the tendency of the blank material to flow into the pattern being impressed in the blank, it is necessary to lap off or otherwise finish the surface of the blank after the fluidic device pattern is impressed therein. Thus the fluidic device pattern must be impressed to a somewhat greater depth in the blank than is ultimately desired in order to compensate for the die breakage which later must be removed. Second, because of the inevitable tendency for the edges of the form punch to break down, it may be desirable to initially have the height of the raised impression somewhat greater than necessary so that, as the form punch wears, the raised pattern may be ground down, thereby prolonging the life of the form punch. The height of the raised pattern on the form punch will of course otherwise vary depending upon the ultimately desired depth of the configuration of the fluidic device in the blank.

The blank is the item in which the impression of the fluidic device is formed. The blank material is preferably a soft, ductile, malleable metal such as copper, brass, or aluminum. The size of the blank will vary depending upon the size of the desired fluidic device. It is necessary that the blank be relatively flat and have a relatively smooth surface finish. After the impression of the fluidic device is formed in the blank, it is necessary, as described above, to finish the face of the blank to a predetermined surface finish. This may be done by lapping or some other suitable method of finishing or polishing.

Depending upon the initial softness or ductility of the blank material, it may be desirable to preheat the blank to a hot working state or thermoplastic state to promote blank ductility before the impression is formed therein. Ductility in the blank is desirable, of course, since more precise configurations may be formed therein than if the material is hard and has a tendency to crack under high stresses. If it is deemed necessary to preheat the blank, it may also be desirable to preheat the nest or a portion of the die-set as well so that the heat of the blank is not lost upon inserting the blank into the nest.

After the pattern is finally formed in the blank, it may be desirable to plate the blank such as by a nickel plating process, in order to increase the wear characteristics of the fluidic device. Whether or not plating is necessary or desirable depends on the type of fluid to be used in the fluidic device and the pressures anticipated in the device.

The press used in forming the pattern of the fluidic device in the blank is preferably a variable contact speed, knuckle-joint press. This type of press allows practically all of the force to be concentrated at precisely the point of impact. The press should be capable of exerting a force of at least 100 tons and preferably closer to 200 or 300 tons. The velocity at the point of impact should be relatively slow in order that precision in the fluidic device configuration may be obtained. A common inertia type of press may also be used in the inventive method but is not as suitable as the aforementioned knuckle-joint press.

To complete the fluidic device a suitable coverplate 18 is fabricated having formed therein the necessary ports 19 for the inlet, outlet, feedback, and so forth. Of course, the ports may be formed in the blank if desired. The coverplate 18 and the blank 16 are secured together by bolts, adhesives, or other suitable means, not shown.

One important consideration in the impacting of fluidic devices is to restrict the flow of metal of the blank to an upward or vertical direction.

Figure 3:
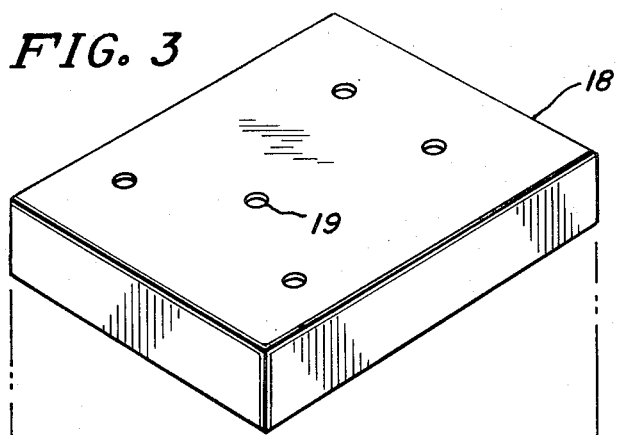
FIG. 3 is a perspective view of the blank having the precision impression of the fluidic device formed therein and a coverplate for completing the fluidic device.
Figure 5:
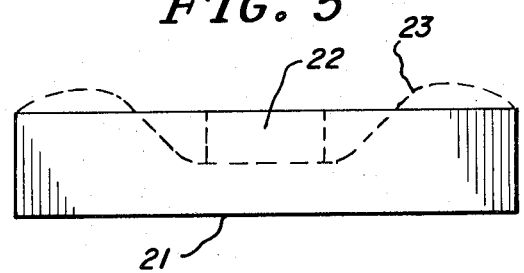
FIGS. 5 and 6 show the flow of metal when a blank is impacted by the impacting tool.

FIG. 5 generally shows the flow of metal when using the impact tools shown in FIGS. 2 and 3. Assuming that a tool is used having a shape thereon which tends to form a square hole 22 in a blank 21, the actual flow of metal which will result (which is exaggerated for emphasis) is shown by the dotted line 23. The metal, because of the horizontal forces on the material, will tend to flow away from the impacting tool, leaving a hole 22 which does not have substantially vertical walls. In fluidic devices of the type herein disclosed, the types of walls shown in FIG. 5 are a detriment and detract from the operation of the fluidic devices.

Figure 7:
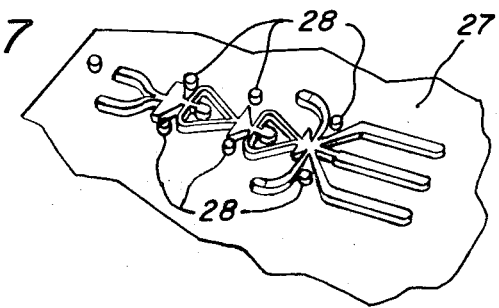
FIG. 7 more specifically shows the fluidic configuration on the die set shown in FIG. 4.

To limit the flow of material to a substantially upward direction, the die set shown in FIG. 4 has been developed. The impacting tool 24 has fixed thereon two cams 25 and 26. The device 24 also has thereon the impression forming means 27 having the fluidic configuration formed thereon. In addition to the fluidic configuration are pins 28 (shown also in FIG. 7) which are strategically placed and are of proper size to help restrict the horizontal flow of material.

Figure 6:
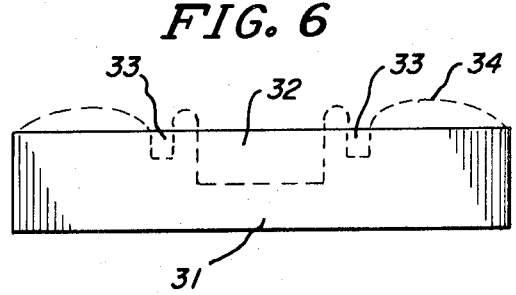
Figure 6:
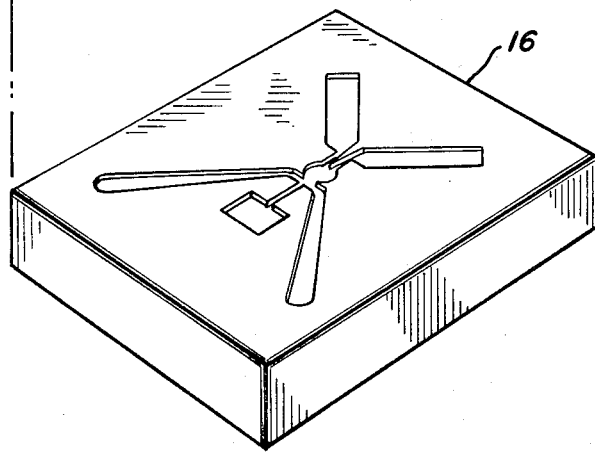

FIG. 6 is intended to show how the metal will flow when an impacted tool having these projections 28 thereon is used to impact a blank. Again, assume that it is intended to form a channel in the blank 31, having substantially vertical channel walls. The hole 32 represents the channel intended to be formed and the holes 33 are formed by the pins 28 on the impacting tool. The pins 28 limit the flow of metal as shown at 23 in FIG. 5 to the flow shown at 34 in FIG. 6. The pins 28 counteract the flow of metal away from those projections on the impacting tool tending to form channel 32 and thus squeeze that metal in an upward direction thereby maintaining substantially vertical channel walls.

The other half of the die-set is shown at 35 in FIG. 4. This half of the die-set has the nest for receiving the impacting tool. The nest half of the die-set comprises two fixed blocks 36 and 37 which can be rigidly fixed to the base member 35 as by holes 38 for receiving bolts. The base member 35 also has thereon sliding nest blocks 41 and 42 which are not rigidly fixed to the base member 35 but are permitted a certain amount of movement. Finally, cam backup blocks 43 and 44 are rigidly mounted on the base member 35 as by bolts through holes 45.

When the first half of the die-set 24 is inverted and used to impact a blank which is placed into the nest 46, the cam member 26, which may be slightly tapered, fits into the space between the fixed block 43 and the sliding block 42, and the cam member 25, which also may be tapered slightly, fits into the space between rigid block 44 and sliding block 41. Because blocks 43 and 44 are fixed, the cams 25 and 26 will tend to push in on sliding blocks 41 and 42. The resulting inward force applied on all sides of the blank will tend to negate the outward force applied to the blank by the fluidic device projections on the impacting tool 27. As shown in FIGS. 5 and 6, the projection which tends to make the channels 22 and 32 exerts a force towards the outer edges of the blanks 21 and 31. However, the camming arrangement of FIG. 4 exerts a force on the blank in an opposite direction and these forces tend to cancel one another resulting in less horizontal movement of metal and greater vertical movement.

The net effect of the improvements shown in FIG. 4 is to restrict the flow of material to a more generally vertical direction, thus insuring that the channel walls are substantially vertical.

The embodiments of the invention in which an exclusive property or right is claimed are defined as follows:

1. A method of making a fluidic device comprising the steps of:
    forming a blank of a relatively soft metal;
    placing the blank and a form punch in a die-set, the form punch having a raised pattern of the desired configuration of the fluidic device on its face, said die-set having means to restrict horizontal flow of displaced metal;
    placing the die-set in a press capable of exerting a high force;
    pressing the form punch into the blank to a predetermined depth whereby the flow of displaced metal is restricted to a substantially upward direction.

finishing the face of the blank to a predetermined surface finish;

fabricating a coverplate for the fluidic device;

forming the necessary ports for the fluidic device; and assembling the blank and the coverplate in a fluid-tight relation.

2. The method of claim 1 wherein the raised pattern of the fluidic device on the form punch is made by electrical discharge machining.

3. The method of claim 1 wherein the form punch is pressed into the blank to a predetermined depth with a force of not less than 100 tons.

4. The method of claim 1 wherein the die-set is placed in a variable contact speed press.

5. The method according to claim 1 comprising the additional step of pre-heating the metal blank to hot working state before placing the blank in the die-set.

6. The method according to claim 1 comprising the additional step of plating the blank to promote hardness after the pattern of the fluidic device is pressed therein.

7. The method according to claim 2 wherein the raised pattern of the fluidic device on the form punch is made by the steps comprising:

etching the desired pattern of the fluidic device on a suitable medium on a predetermined scale;

transferring the pattern from the suitable medium to a template on a smaller scale;

reproducing the pattern of the fluidic device on the template onto a plurality of electrodes on a one-to-one scale;

burning the pattern of the fluidic device onto the form punch with the plurality of electrodes on an electrical discharge machine; and, finishing the surface of the form punch to a predetermined surface finish and pattern height.

8. The method of claim 1 comprising the step of providing on the form punch projections strategically located whereby the metal flow of the blank is limited to a substantially vertical direction.

9. The method of claim 1 comprising the step of exerting an inward force by camming around the edges of the blank to counteract the horizontal force exerted on the metal by the form punch.

10. The method of claim 9 comprising the step of providing projections on the form punch for limiting the flow of metal of the blank to a substantially vertical direction.

* * * * *